United States Patent [19]

Miyazaki et al.

[11] Patent Number: 4,609,919

[45] Date of Patent: Sep. 2, 1986

[54] SENTENCE DISPLAYING APPARATUS WITH SENTENCE SECTION

[75] Inventors: Akira Miyazaki; Jun-ichi Yamaguchi, both of Kanagawa, Japan

[73] Assignee: Fuji Xerox Co., Ltd., Tokyo, Japan

[21] Appl. No.: 541,209

[22] Filed: Oct. 12, 1983

[30] Foreign Application Priority Data

Oct. 12, 1982 [JP] Japan ................................ 57-178737

[51] Int. Cl.$^4$ ............................................. G09G 3/00
[52] U.S. Cl. .................................... 340/792; 340/715; 340/726
[58] Field of Search ............... 340/792, 802, 715, 726, 340/748, 750

[56] References Cited

U.S. PATENT DOCUMENTS

| | | | |
|---|---|---|---|
| 3,891,792 | 6/1975 | Kimura | 340/726 |
| 4,359,730 | 11/1982 | Kunikane et al. | 340/792 |
| 4,475,806 | 10/1984 | Daughton et al. | 340/715 |
| 4,503,428 | 3/1985 | Hashimoto et al. | 340/792 |
| 4,510,491 | 4/1985 | Prato | 340/792 |

Primary Examiner—Gerald L. Brigance
Attorney, Agent, or Firm—Sughrue, Mion, Zinn, Macpeak & Seas

[57] ABSTRACT

A copying machine including a visual display medium for visually displaying sentences corresponding to the machine operating status and operator instructions for curing machine malfunctions, such as a paper jam. The copying machine includes a sentence display control section which generates signals, representing the sentence or sentences to be displayed, to a drive section which controls the machine display. A machine status signal determines the sentence display control section signals supplied to the drive section. To overcome limitations imposed on sentence length by the limited machine display size, the sentence display control section is provided with means to divide long sentences into sections and to cause the machine display to display long sentences sequentially in a time division manner. A further feature allows multiple short sentences, each capable of being displayed in its entirety on the machine display, to be displayed in preselected sequences, at predetermined times and for predetermined time intervals.

4 Claims, 19 Drawing Figures

SENTENCE DISPLAYING APPARATUS WITH SENTENCE SECTION

BACKGROUND OF THE INVENTION

The invention relates to copying machines and to display devices for visually displaying the machine status.

Sentence displaying apparatus are known in the art. For example, a displaying section, including a sentence displaying tube, is provided in a copying machine console, and sentences stored in a sentence storing ROM in a control section of the machine are selectively displayed on the displaying section, to report the states of the copying machine.

In such a sentence displaying apparatus, the number of sentences to be displayed is limited by the storage capacity of the sentence storing ROM. Therefore, the larger the ROM, the greater is the number of sentences which can be selected from among the available display sentences, and printed on a display board, which board is illuminated from behind with a display lamp.

However, in the prior art sentence displaying apparatus, the area of the display board on the copying machine's console is limited, and, therefore, a long sentence cannot be displayed, a "long sentence" being defined as a sentence in which the number of characters exceeds a predetermined value.

SUMMARY OF THE INVENTION

An object of the invention is to effectively expand the display area for sentence display of a sentence displaying apparatus.

Another object of the invention is to display long sentences having character lengths in excess of the display length.

These and other objects of the invention, as will become apparent from the description of the invention set forth hereinafter, are obtained by dividing or sectionalizing a sentence containing more than a predetermined number of characters (i.e., a long sentence) into a plurality of parts, and then causing the parts to be displayed successively in a time division manner. In this manner, even long sentences can be displayed on a display device with limited display area.

DETAILED DESCRIPTION OF THE PREFERRED EMBODIMENTS

Figure 1:
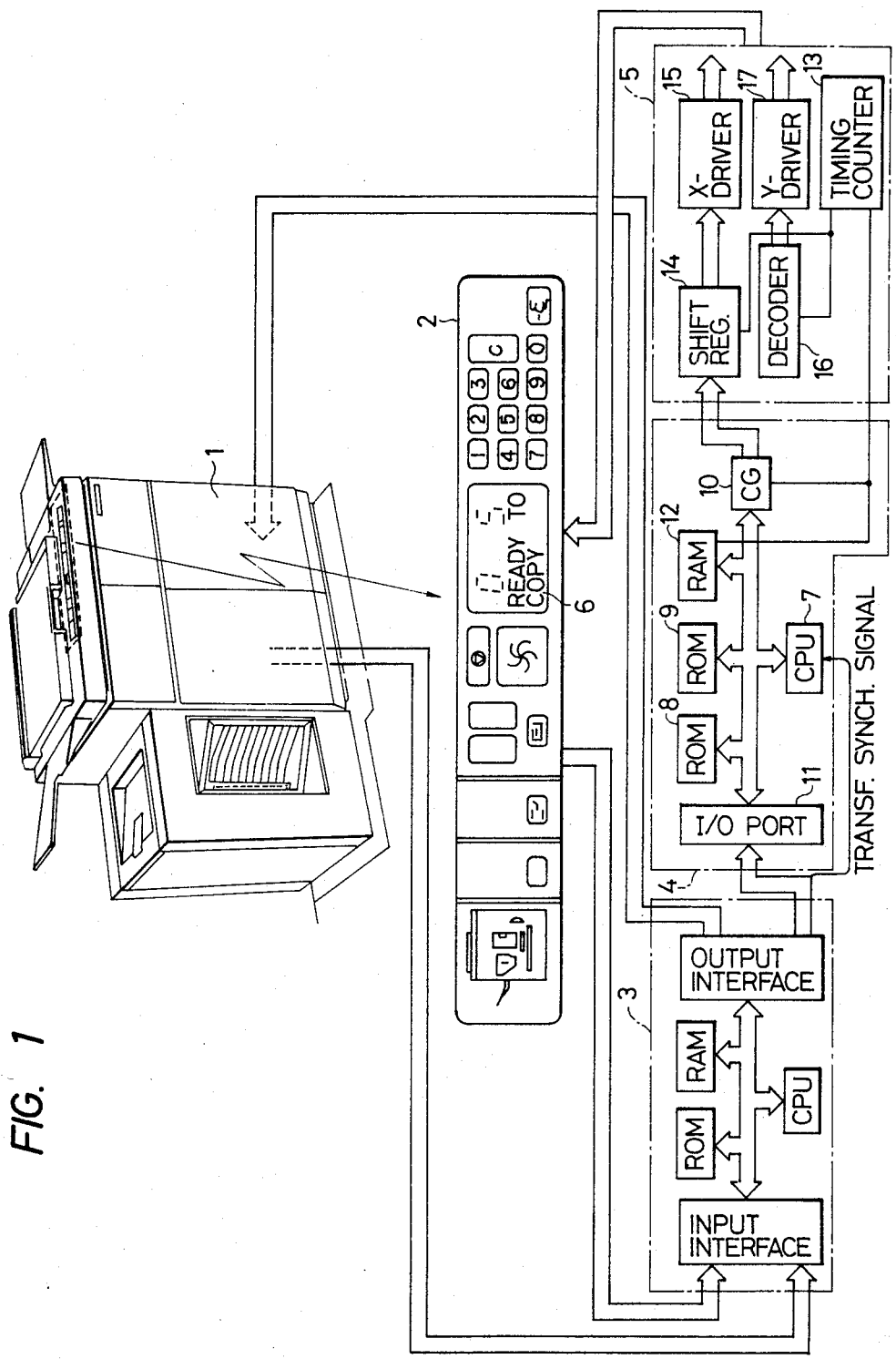
FIG. 1 is an explanatory diagram showing one example of a sentence displaying apparatus according to this invention.

One embodiment of the sentence displaying apparatus according to the invention, as shown in FIG. 1, comprises: a copying machine control section 3 for controlling a copying machine 1, which copying machine has a console 2; a sentence display control section 4 for outputting a display signal according to a control signal from the control section 3; and a drive section 5 for causing the display section 6 in the console 2 to display sentences as commanded by the display signal from the sentence display control section 4.

The copying machine control section 3 is a microcomputer having an input/output interface, a ROM for programming, a CPU for processing operation and a RAM for storing the results of the processed operation. The control section 3 receives a sensor signal from the copying machine 1 and an operating signal from the console 2, in order to output a control signal for controlling the operation of the copying machine 1 and a status signal indicating the status of the copying machine 1.

The sentence display control section 4 comprises: an input/output port 11 for receiving the status signal from the control section 3; a sentence control ROM 8 storing a program for processing the status signal and determining the sentence display mode; and a sentence ROM 9 which stores a status table (described later) or a predetermined display sentence in the form of a character code train. The sentence display control section 4 also comprises a CPU which processes the status signal in accordance with the program stored in the sentence control ROM 8, determines the sentence number for the sentence which is in agreement with the status of the copying machine 1, and reads the sentence which agrees with the status of the copying machine 1 out of the sentence ROM 9. The CPU 7 also determines that display mode for the sentences read. The display mode indicates whether the sentence should be displayed in its entirety at one time or in a plurality of parts in a time division manner. The CPU further determines the timing of sentence display, and the period of time for display.

The sentence display section 4 also comprises a RAM 12 for storing the sentence thus read and its display mode, as well as a character generator 10 (which may, for example, be configured in a 5×7 dot matrix array) to generate the display sentence character patterns according to the contents of the RAM 12.

The drive section 5 comprises: a shift register 14 which is controlled by a timing signal from a timing counter 13, and outputs a drive signal conforming to the sentence character patterns generated by the character generator 10; an X-drive 15 for lighting the display panel 6 in a dot display manner according to the drive signal outputted by the shift register 14; a decoder 16 for developing the timing signal from the counter 13 and outputting a drive signal; and a Y-driver 17 for dynamically displaying the sentence character pattern from the character generator 10 according to the output drive signal of the decoder 16.

The sentence control ROM 8 in the sentence display control section 4 will be described in far more detail. The ROM 8 stores a program for processing the status signal and determining the sentence display mode, which program is specifically (a) receiving and inspecting the status signal fed from the control section 3 at every constant period, e.g. 200 msec;
(b) determining a sentence output case for the received status signal;
(c) computing a sentence number in accordance with the sentence output case thus determined;
(d) setting the sentence read out from the sentence ROM 9 into the RAM 12; and
(e) instructing to provide the output of the sentence display section 4 to the drive section 5.

Figure 8:
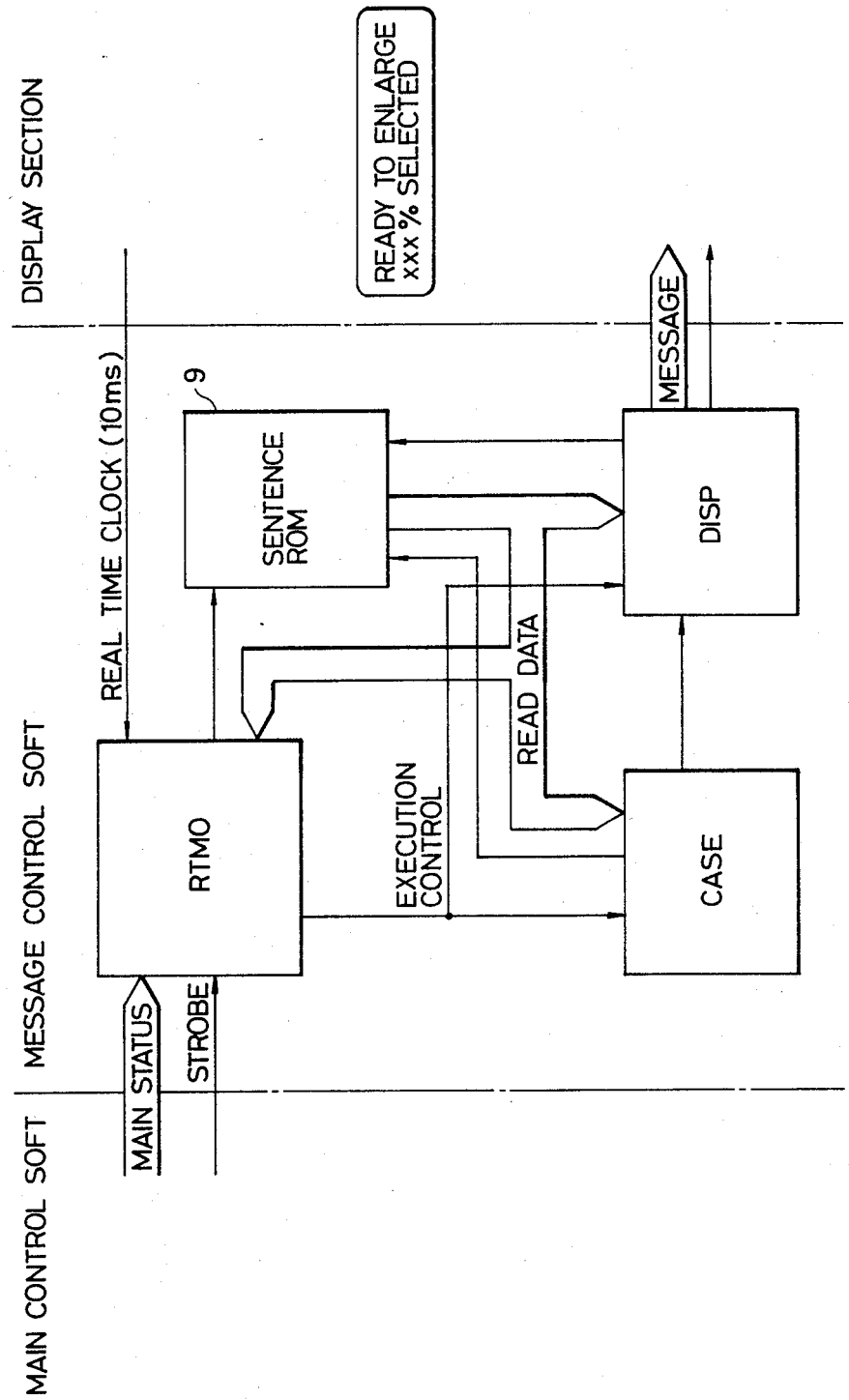
FIG. 8 is a block diagram showing the sentence control ROM according to the invention.

The sentence control ROM 8 is made up of three modules, the processing content of each of the modules is indicated in Table 1 below, and an explanatory block diagram of the ROM 8 is shown in FIG. 8.

TABLE 1

| Module | Processing Content |
| --- | --- |
| Real Time Monitor control (RTMO) | 1. Receiving main status from a main control software and inspecting the same.<br>2. Controlling operation time of a message control software.<br>3. Controlling message output time.<br>4. Self-testing at the time of power on. |
| Case Selection Module (CASE) | 1. Determining an output case for the status of the copying machine and the operation by an operator.<br>2. Determining an output message for the ON state of help key.<br>3. Setting an output format and output time of a sentence read out from the sentence ROM 9. |
| Display Module sentence (DISP) | 1. Reading a sentence out of the ROM 9.<br>2. Controlling an output to the display section 6. |

Figure 9:
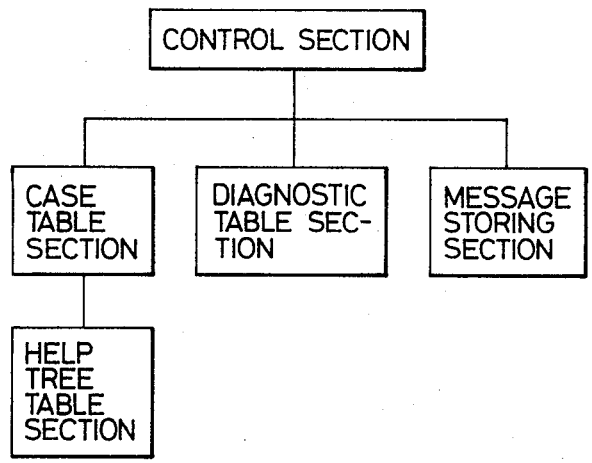
FIG. 9 is a block diagram showing the sentence ROM according to the invention.

The sentence ROM 9 as used in the invention has a feature such that its memory region is separated into a case table section where output formats of a display sentence and sentence numbers are stored corresponding to a status, and a sentence storing section where the display sentences are stored. An explanatory block diagram of the sentence ROM 9 is shown in FIG. 9, and the stored contents in those sections shown in FIG. 9 are indicated in Table 2 below. Details of the case table section, help tree table section, control section and sentence storing section are shown in FIGS. 2A through 2D, respectively.

TABLE 2

| Name | Contents |
| --- | --- |
| Control Section | Data of regions occupied by the respective sections. |
| Case Table Section | Data of output format, sentence number, pointer to help tree table, being stored corresponding to the status of the copying machine. |
| Help Tree Table Section | Help tree defining table to be outputted as help messages being linked with the case table. |
| Diagnostic Table Section | Output sentence number table for diagnostic. |
| Sentence Storing Section | Sentences which are stored in divided areas corresponding to 40, 60 and 80 characters. |

Figure 2A:
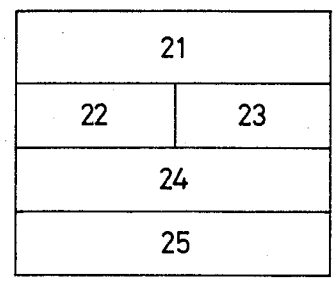
FIGS. 2A through 2D are explanatory diagrams showing part of a sentence ROM in the apparatus of the invention.

FIG. 2A shows a case table for producing a sentence display which corresponds to the status of machine 1 as it is determined from a status signal generated from the copying machine control section 3. In FIG. 2A, a region 21 stores the initial sentence number of a display sentence according to a copying machine status. A region 22 stores alternate modes (in which a plurality of sentences are alternately displayed) described hereinafter. A region 23 stores a help sentence hierarchical number which defines a displaying sentence according to the number of times the help button is operated. (A help sentence is displayed upon the operation of the help button by the operator). A region 24 stores an alternate sentence number to be displayed in place of the initial sentence stored in a region 21. A region 25 stores a help table pointer which specifies a sequential help tree table, which table is described hereinafter with reference to FIG. 2B.

Figure 2C:
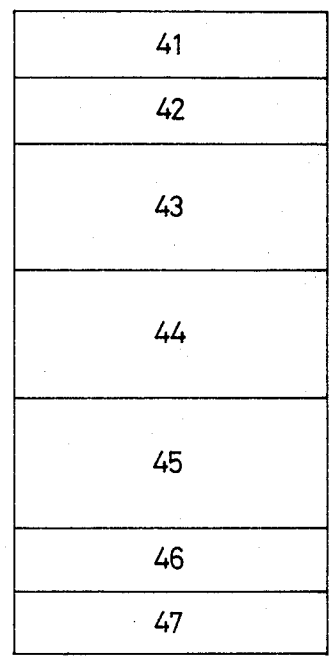
Figure 2B:
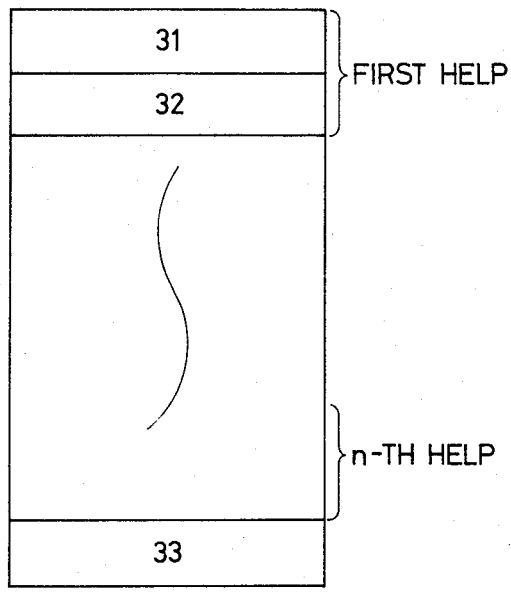

Regions 31, 32, . . . and 33 of FIG. 2B store help sentence numbers designated according to the number of times the help button is operated.

FIG. 2C shows a control table. A region 41 stores the number of sentences stored in the sentence ROM 9. A region 42 stores the first part of the addresses in which the status table is stored and a region 43 stores the first part of the addresses in which the sequential help tree table is stored. A region 44 stores the first part of the addresses of a stored diagnostic case table. A region 45 stores the first part of the addresses of the stored sentences to be displayed. A region 46 stores the address of the first sixty character sentence (defined as another with forty one to sixty characters) among the stored display sentences. A region 47 stores the address of the first sentence of the display sentences containing sixty one to eighty characters; termed herein, eighty-character sentences.

Figure 2D:
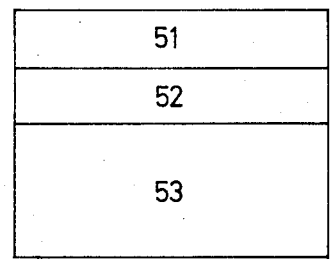

FIG. 2D shows the sentence storing section. The display sentences are stored in the form of character code trains in a region 53. The display sentence is sometime displayed with revised or rewritten data, such as the requirement for reduction or enlargement of scale. At such times, the position of a character or characters in the display sentence containing the rewritten data is stored in regions 51 and 52.

Figure 3:
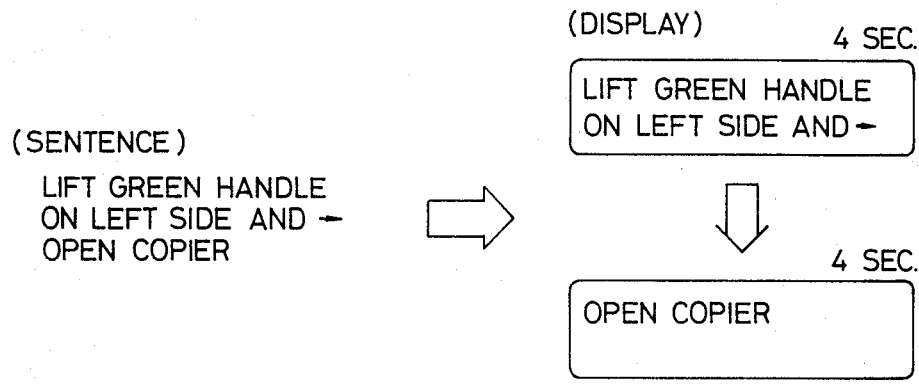
FIG. 3 is an explanatory diagram showing a scroll display operation in the apparatus of the invention.
Figure 4:
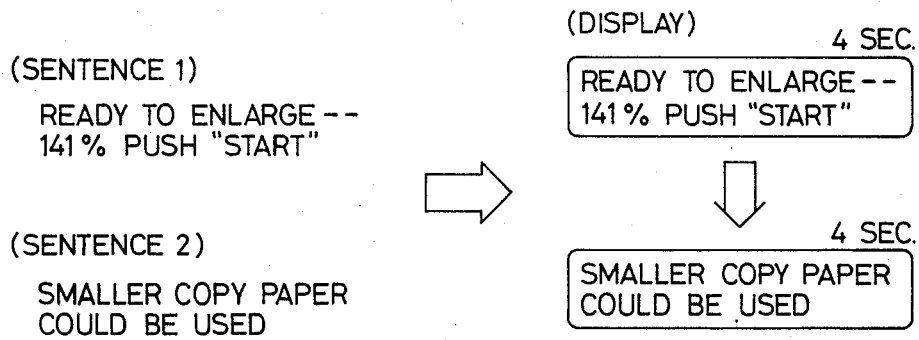
FIG. 4 is an explanatory diagram showing an alternate display operation in the apparatus of the invention.

FIG. 3 and FIG. 4 show sentence display modes. FIG. 3 indicates a scroll system, while FIG. 4 indicates an alternate system. In the scroll system, when the number of characters forming a display sentence exceeds a predetermined value (for instance, forty (40)), the sentence is displayed in a time division manner by dividing it into a plurality of parts (for instance two parts). For example, a sentence "LIFT GREEN HANDLE ON LEFT SIDE AND OPEN COPIER" is divided into two parts "LIFT GREEN HANDLE ON LEFT SIDE AND—" and "OPEN COPIER," which are each displayed for four seconds. In the alternate system, for instance a first sentence "READY TO ENLARGE—141% PUSH 'START'" and a second sentence "SMALLER COPY PAPER COULD BE USED" are displayed alternately for a period of time (for example, four seconds each).

Figures 5A, 5B:
FIGS. 5A and B are explanatory diagrams showing display modes in the invention.

FIG. 5A and FIG. 5B show two alternate modes of sentence display. In FIG. 5A, the first sentence 1 and the second sentence 2 are displayed alternately three times and then either the first sentence 1 or the second sentence 2 is displayed. (The abbreviation "MSG" stands for "message" and corresponds to a sentence.) In FIG. 5B, the first sentence 1 and the second sentence 2 are displayed alternately for a period of 60 seconds, and thereafter either the first sentence 1 or the second sentence 2 is displayed. In FIGS. 5A and 5B, the first line of the figure illustrates the case where each of the first and second sentences has forty (40) or less characters. The second line demonstrates the sentence display where each of the first and second sentences has more than forty characters, and the last lines of FIGS. 5A and 5B demonstrate the sentence display where the number of characters of the first sentence 1 is forty or less and that of the second sentence 2 is more than forty charcters. In the latter two lines of FIGS. 5A and 5B, when the number of characters of each sentence is larger than forty, the sentences are displayed in the scroll system. Other alternate modes than those indicated by FIG. 5A and FIG. 5B may be employed. For example, instead of the mode in which the alternate sentence displays are carried out for four seconds each, an alternate mode in which a state is displayed until the state of the copying machine 1 is changed may be employed. These alternate modes are stored in the region 22 of FIG. 2A.

FIGS. 6A through 6E, illustrate the details of the region 23 of FIG. 2A and the sequential help tree table of FIG. 2B, showing examples of sentence outputs where sheets of paper are caught or jammed in the copying machine 1, thereby preventing further operation of the machine until the condition is corrected.

Figure 6C:
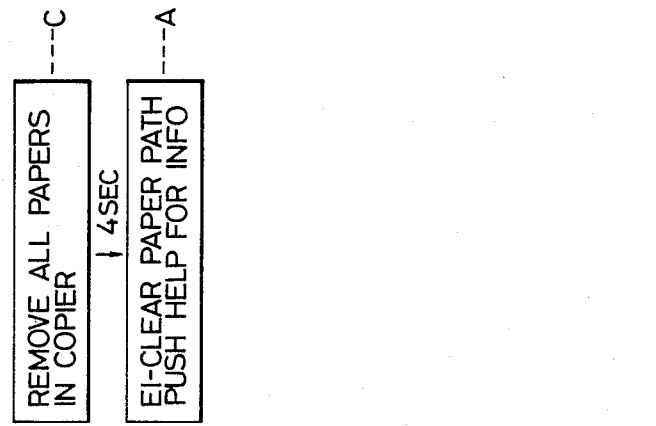
FIGS. 6A through E are explanatory diagrams showing help sentence display modes.
Figure 6B:
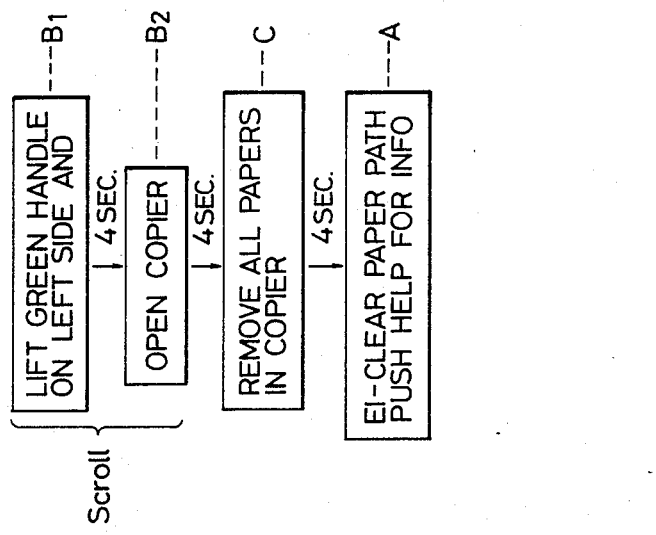
Figure 6A:
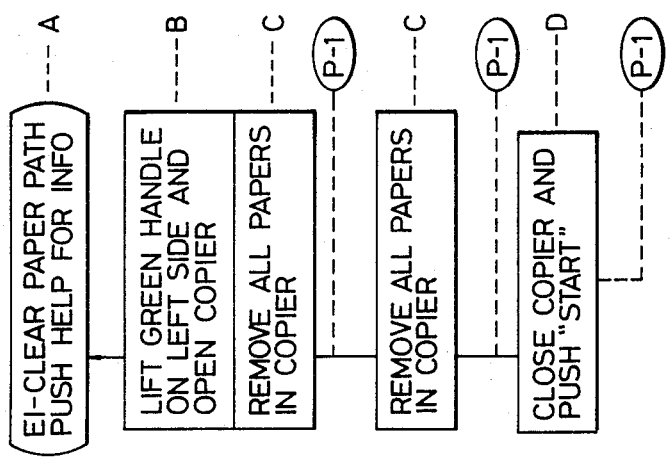

FIG. 6A shows a sentence output sequence, and the display sentences are as follows:

A—"EI-CLEAR PAPER PATH PUSH HELP FOR INFO (Clear the path of the paper. Push the help button for information)" where EI is "a sentence code."

B—"LIFT GREEN HANDLE ON LEFT SIDE AND OPEN COPIER."

C—"REMOVE ALL PAPERS IN COPIER (Remove all papers from the copier)."

D—"CLOSE COPIER AND PUSH START (Close the copier and push the start button)."

Figure 6D:
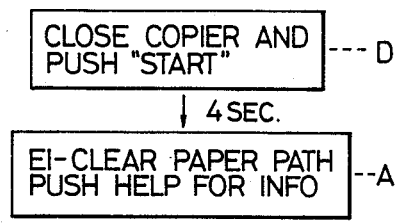
Figure 6E:
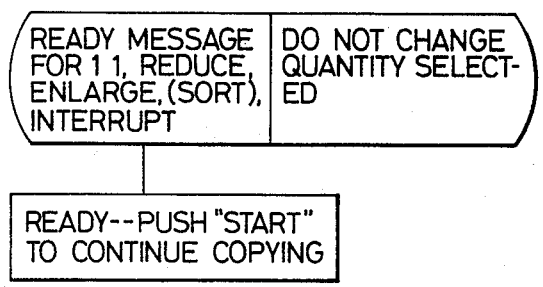

FIG. 6B shows the display where the help button is depressed once, in response to the display of message A of FIG. 6A on the display section 6. FIG. 6C shows the display routine where the help button is depressed twice after the display A of FIG. 6A is shown. FIG. 6D shows the display where the help button is operated three times. If the help button is operated again, the displays are repeated in the order of FIGS. 6B, 6C and 6D. In any one of the situations described above, the display may be carried out in the alternate mode shown in FIG. 5A and the sentence B is scroll-displayed by being divided into two parts, $B_1$ and $B_2$. This was done because the number of characters in the sentence is larger than forty (40).

In FIG. 6, after the papers have been removed, a (P-1) display is carried out. The (P-1) display is as shown in FIG. 6E:

"READY MESSAGE FOR 1:1, REDUCE, ENLARGE, (SORT), INTERRUPT" "DO NOT CHANGE QUANTITY SELECTED" "READY-PUSH 'START' TO CONTINUE COPYING"

The flow chart of FIG. 7 describes the operation of the sentence display apparatus, utilizing the sentence display modes described hereinabove.

The sensor in the copying machine 1 sends a sensor signal which indicates the state, that is, status of the copying machine 1 to the copying machine control section 3. A status signal corresponding to the status of the copying machine is applied to the sentence display control section 4, while being synchronized to a transferring synchronizing signal (data reception). If no abnormal conditions (for example, noise) are detected upon reception of the status signal, then it is determined to be a normal reception in a received-data inspection. The status signal is processed by the CPU 7 according to the program in the ROM 8, so that the status of the copying machine 1 is determined according to the status signal.

When it is decided that the status is different from the preceding case, the case state table of FIG. 2A corresponding to that status is read out of the sentence ROM 9 into the RAM 12, and simultaneously the help tree table FIG. 2B is read into the RAM 12 by the help table pointer of the status table region 25. Reading the case table and the help tree table is carried out with addresses determined according to the contents of the regions 42 and 43 of the control table, FIG. 2C. An address is determined for the initial sentence number in the case table's region 21 according to the above-described status decision and the contents of the control table's regions 45, 46 and 47. The sentence memory section FIG. 2D is read from the address thus determined into the RAM 12, so that the sentence (character code train) in the region 53 is stored in the RAM 12.

The presence or absence of rewriting data and/or an alternate sentence is detected according to the contents of the sentence storing section's regions 51 and 52 and the contents of the case table's region 22. If rewriting data (for example, a scale factor) is to be displayed the rewriting data is rewritten in accordance with a signal from the console 2. If an alternate sentence is to be used, the four-second timer is set. If the number of characters in the sentence are such that the sentence contains greater than forty characters thus requiring the scroll display, the four-second time is also set. If three-times alternate display of FIG. 5A is carried out, the number of times is counted by the counter.

The character code trains are then delivered from the RAM 12 to the character generator 10. When forty character codes, for using the initial portion of a long sentence are delivered to character generator 10, the generator 10 produces character patterns, which are inputted to the shift register 14. The shift register 14 drives the X-driver 15, while the Y-driver 17 controls the dynamic lighting operation, so that the initial sentence is displayed on the display section.

The selection of one of the alternate modes described in FIG. 5A and FIG. 5B is made according to the contents of the case table's region 22. The contents of the case table's region 22 also determines whether a sentence is to be fixedly displayed after the alternate display has been accomplished.

The contents of the case table's region 23 controls the display of the help sentence shown in FIGS. 6A through E.

As described above, the initial sentence, alternate sentence or help sentence are displayed according to the status of the copying machine. The length of the display sentence displayed in the display section is limited. That is, when the number of the characters to be displayed exceeds a predetermined number, the time division display (scroll display) is carried out. The time division display is such that in the case where the display sentence contains, for example, sixty (60) characters but the display section has a displaying capacity of only forty (40) characters, the display sentence is divided into two parts, the first part containing 1st–40th characters and the second part containing 41st–60th characters, and each part is alternately displayed for four seconds. Such a time division display is carried out by a sentence control section which includes:

(a) character number judging means for judging whether or not the display sentence contains more than a predetermined number of characters;

(b) time division display setting means for setting the display mode to a time division display mode when it is judged by the judging means that the number of characters of the display sentence exceeds the predetermined number;

(c) scroll timer setting means for actuating a scroll timer which measures a display time in accordance with the output of the time division display setting means;

(d) first output instruction means for instructing to output the display sentence upon dividing the sentence into sentence units, each unit containing characters equal to or less than the predetermined number;

(e) display sentence unit checking means for identifying the sentence unit instructed by the instruction means when the display time set by the scroll timer is elapsed; and (f) second output instruction means for instructing the outputting of another sentence unit different from the sentence unit which has been displayed in accordance with an output of the display sentence unit checking means.

The sequence of the time division display will be described with reference to a flow chart shown in FIGS. 10A and 10B. In this embodiment, the judgement of the number of characters is carried out with two steps, the first step for judging the area of the sentence storing section where the display sentence is stored, and the second step for counting the number of characters of the sentence read out. If the judgement of characters is carried out in such a way, it becomes possible to display sentences of various languages simply by exchanging the sentence ROM. The area of the sentence storing section is divided as follows:

a 40 character area for a sentence having characters equal to or less than 40;

a 60 character area for a sentence having characters greater than 41 but less than 60; and an 80 character area for a sentence having characters greater than 61 but less than 80.

Figure 7:
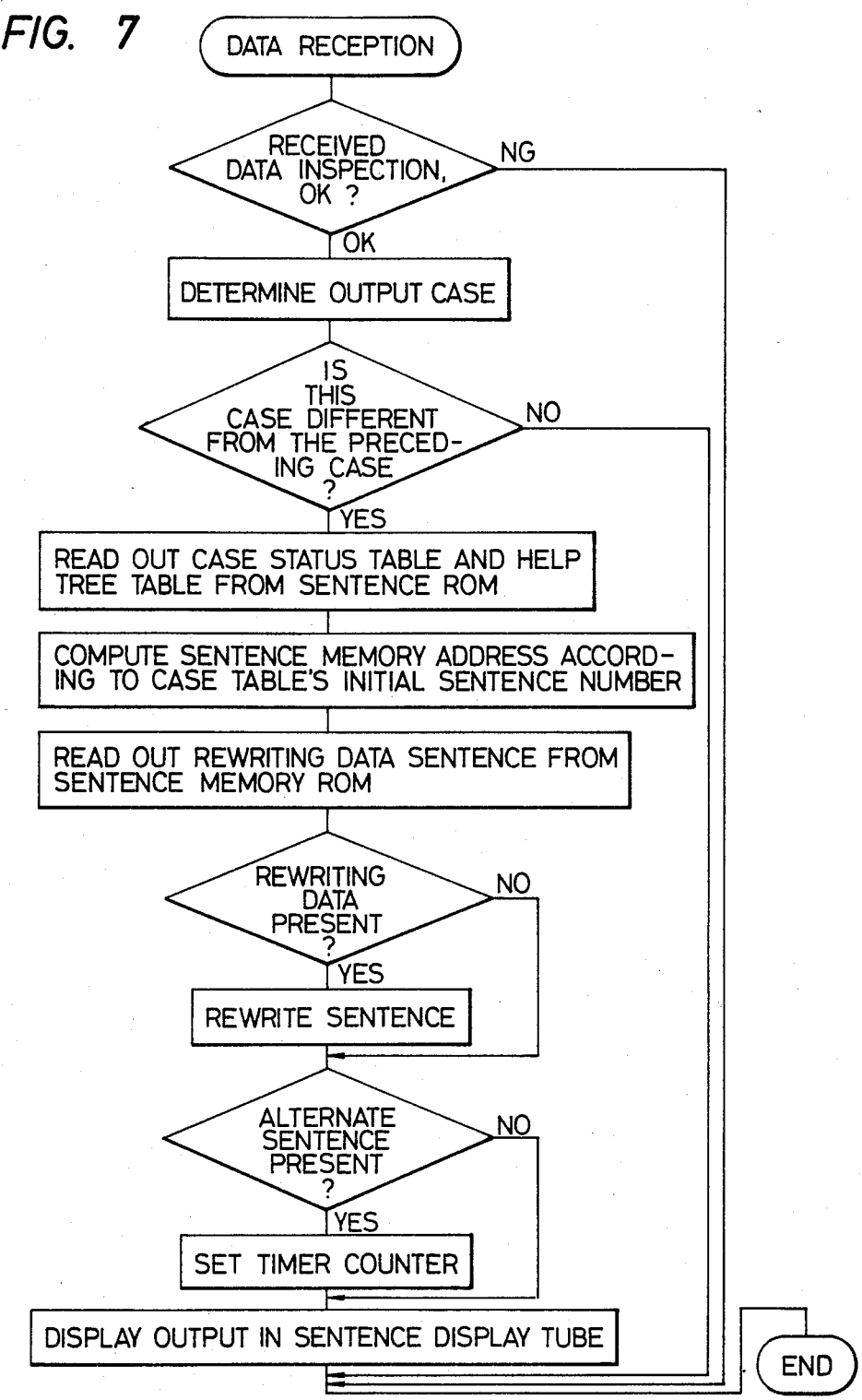
FIG. 7 is a flow chart of one example of the operation of the apparatus according to the invention.
Figure 10A:
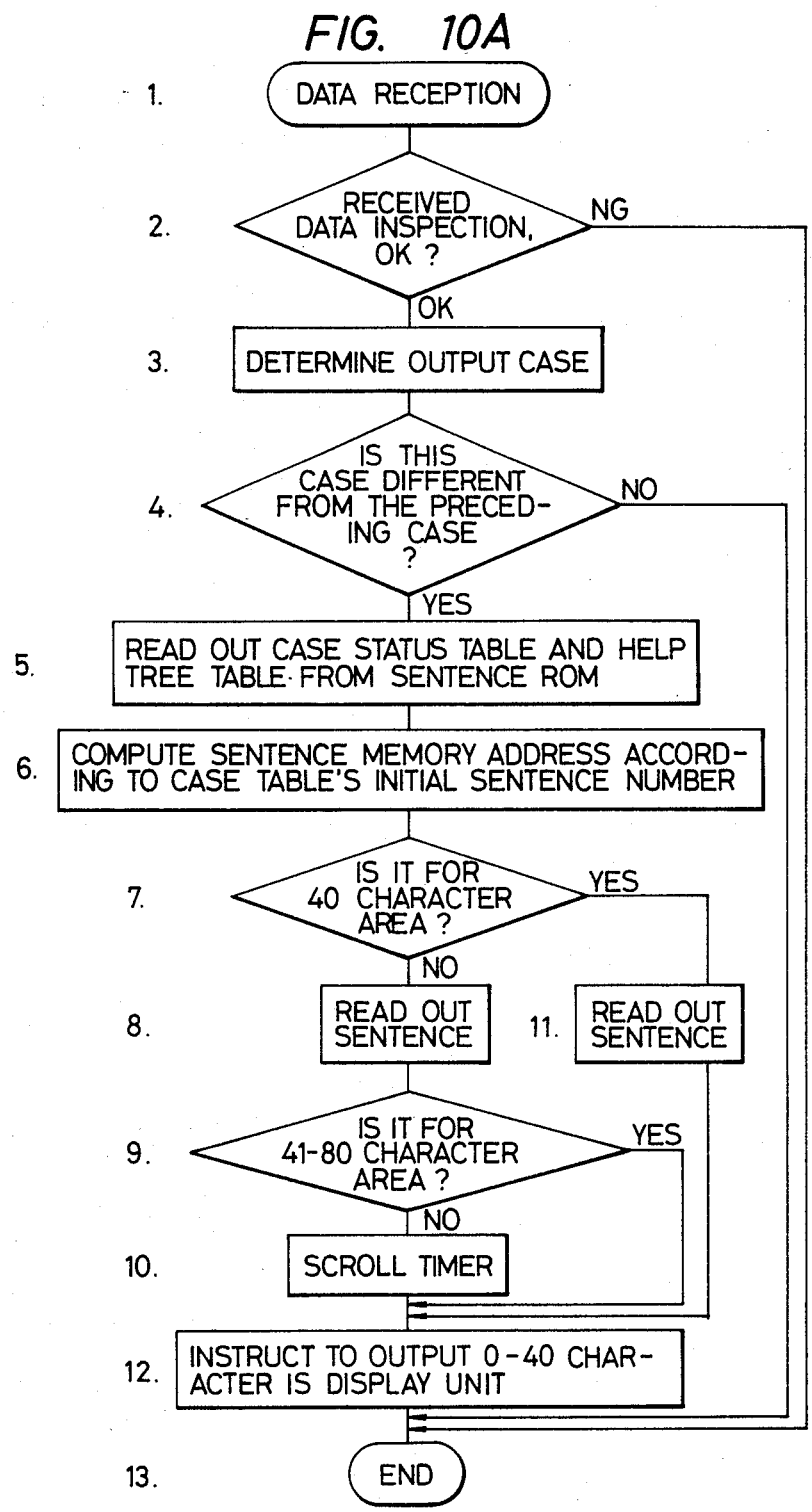
FIGS. 10A and 10B are flow charts of one example of the time division display operations of the apparatus according to the invention.
Figure 10B:
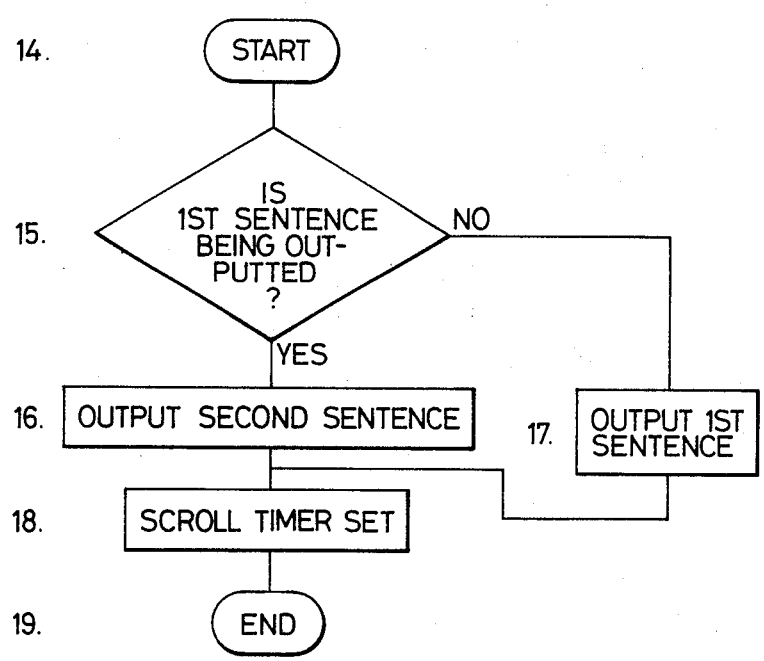

The first step (1) to the sixth (6) step of the flow chart shown in FIG. 10A are identical to those shown in FIG. 7, therefore description will not be repeated here.

After computing the sentence storing address, the area where the sentence is stored is judged (step 7). In the case where the sentence is located in an area other than the 40-character area, the stored sentence is read out into the RAM 12 (step 8). At this time, the number of characters is computed and to judge whether the number thereof is greater than 41 but less than 80 (step 9). If this is the case, the RAM 12 is so set that the sentence is displayed in the time division manner, and concurrently the scroll timer is set to measure the display time (step 10). It is then instructed to output the first forty characters of the display sentence in the sentence display tube (step 12). While the scroll timer is running, the first 40 characters are being outputted, and when the scroll timer times out, the routine is shifted to the one shown in FIG. 10B. If the sentence currently being displayed is one containing equal to or less than 40 characters (first sentence), then an instruction is issued so that the sentence corresponding to 41st to 80th characters (second sentence) is displayed and the scroll timer is again set. Display of the second sentence is performed, for example, by adding 40 addresses to the preceding address number, whereby the second sentence is read out from the sentence ROM 9 and set the same into the RAM 12. In response to the time out of the scroll timer, judgement of the sentence currently being displayed is carried out. If it is judged that the second sentence is outputted, then an instruction is issued to output the first sentence. In this manner, the first and second sentences are alternately displayed. Such a display is repeatedly carried out in accordance with the instructed output format for the predetermined number of times or for a predetermined period of time.

What is claimed:

1. A sentence displaying apparatus which comprises:

a sentence memory for storing predetermined display sentences;

means for producing sentence display instructions, including an alternate mode display instruction for alternating display of multiple sentences;

a signal processing means responsive to said sentence display instructions for reading respective display sentences out of said sentence storing memory according to said sentence display instructions; and a display section for displaying display sentences;

said signal processing means including dividing means for dividing a selected display sentence into a plurality of parts when the number of characters of the display sentence to be displayed on said display section is larger than a predetermined value, and means for providing said divided sentence parts to said display section for display in a time division manner with predetermined display timing;

said display section responding to said alternate mode instruction signal to alternately and repetitively display plural sentences with each of said plural sentences being displayed in a time division manner if the number of characters of said each sentence exceeds said predetermined value.

2. A sentence displaying apparatus as claimed in claim 1, wherein said plural sentences to be alternately displayed comprise first and second sentences each having a number of characters less than said predetermined value, said display section repetitively performing display operations, each display operation comprising displaying one of said first and second messages followed by the other of said first and second messages, each of said first and second messages being displayed in its entirety for a predetermined period of time.

3. A sentence displaying apparatus as claimed in claim 1, wherein said plural sentences to be alternatingly displayed comprise first and second sentences each having a number of characters greater than said predetermined value, said display section repetitively performing a plurality of display operations, each said display operation comprising the display of one of said first and second messages in a time division manner followed by the display of the other of said first and second messages in a time division manner.

4. A sentence displaying apparatus as claimed in claim 1, wherein said plural sentences to be alternatingly displayed comprise a first sentence having a number of characters less than said predetermined value and a second sentence having a number of characters greater than said predetermined value, said display section including means for repetitively performing a display operation in which one of said first and second sentences is displayed and then the other of said first and second sentences is displayed, said first sentence being displayed in its entirety for a predetermined period of time and said second sentence being displayed in a time division manner.

* * * * *